(12) United States Patent
Laaksonen et al.

(10) Patent No.: US 12,418,762 B2
(45) Date of Patent: Sep. 16, 2025

(54) IMAGE AND AUDIO APPARATUS AND METHOD

(71) Applicant: Nokia Technologies Oy, Espoo (FI)

(72) Inventors: Lasse Juhani Laaksonen, Tampere (FI); Arto Juhani Lehtiniemi, Lempaala (FI); Miikka Tapani Vilermo, Siuro (FI)

(73) Assignee: Nokia Technologies Oy, Espoo (FI)

(*) Notice: Subject to any disclaimer, the term of this patent is extended or adjusted under 35 U.S.C. 154(b) by 13 days.

(21) Appl. No.: 17/731,526

(22) Filed: Apr. 28, 2022

(65) Prior Publication Data

US 2022/0360925 A1 Nov. 10, 2022

(30) Foreign Application Priority Data

May 5, 2021 (EP) .................................. 21172181

(51) Int. Cl.
*H04S 7/00* (2006.01)
*G06F 3/16* (2006.01)
*G11B 27/036* (2006.01)
*G11B 27/34* (2006.01)
*H04N 21/439* (2011.01)
*H04N 21/81* (2011.01)

(52) U.S. Cl.
CPC .............. *H04S 7/30* (2013.01); *G11B 27/036* (2013.01); *G11B 27/34* (2013.01); *H04S 2400/11* (2013.01)

(58) Field of Classification Search
USPC .................................. 386/278–290, 239–248
See application file for complete search history.

(56) References Cited

U.S. PATENT DOCUMENTS

| 2012/0082322 | A1* | 4/2012 | van Waterschoot ...... H04S 7/30 381/92 |
| 2015/0373474 | A1 | 12/2015 | Kraft et al. |
| 2016/0088417 | A1* | 3/2016 | Kim ........................ H04S 1/005 381/17 |
| 2018/0341455 | A1 | 11/2018 | Ivanov et al. .................... 3/165 |
| 2021/0409876 | A1* | 12/2021 | Hildebrand .......... H04R 25/558 |

FOREIGN PATENT DOCUMENTS

| CN | 111344785 A | 6/2020 |
| EP | 3683794 A1 * | 7/2020 ........... G10L 19/012 |
| WO | WO-2020/193851 A1 | 10/2020 |

\* cited by examiner

*Primary Examiner* — Hung Q Dang
(74) *Attorney, Agent, or Firm* — McCarter & English, LLP (57) ABSTRACT

An apparatus including circuitry configured for causing audio processing to a spatial audio-visual representation of an image and sound apparatus, the spatial audio-visual representation being live or reproduced from recording; and modifying the audio processing applied to an audio-visually manipulated spatial section of the spatial audio-visual representation in response to information a prior audio-visual manipulation with data processing in the audio-visually manipulated spatial section.

20 Claims, 6 Drawing Sheets

IMAGE AND AUDIO APPARATUS AND METHOD

FIELD

The invention relates to an image and audio apparatus and a corresponding method.

BACKGROUND

Video capture is one of the key use cases for smartphones. High-quality video capture features (e.g., 4k resolution, high frame rates, image stabilization) and spatial audio capture enable compelling content creation. 5G and various content sharing services make it possible to even share such experiences live from the location.

Spatial audio is also becoming more and more common on smartphones. Spatial audio can be captured with various microphone configurations. For very high-quality spatial audio, it is common that at least three microphones are required for planar capture (e.g., directions around a user but no differentiation on height) and at least four microphones are required for full 3D audio.

The video capture may include unwanted and/or distracting people or other objects present and the user remove them or replace them with some other objects. For example, a holiday video in nice surroundings may be ruined by another person in the background. For this reason, techniques to edit the content (photos, videos) by removing undesired objects are becoming more common.

Typically, object or area can be indicated, and this area of the image is replaced by computationally-generated content based on the surrounding content and content available elsewhere in the image. This can be called content-aware fill (CAF).

However, the audio suppression can seldom be perfect in practical environments. While the directional audio will be removed as well as possible, it is likely that some remnants remain there. These residual signals are typically faint and they are not necessarily limited to said direction (e.g., they can include reflections from other directions, etc.), but they become a problem as soon as the user starts to manipulate the audio environment further from the original settings. For example, the user may wish to process further the audio representation.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 13.

According to an aspect of the present invention, there is provided a method claims 14 to 15.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Example embodiments of the present invention are described below, by way of example only, with reference to the accompanying drawings, in which.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

Figure 1:
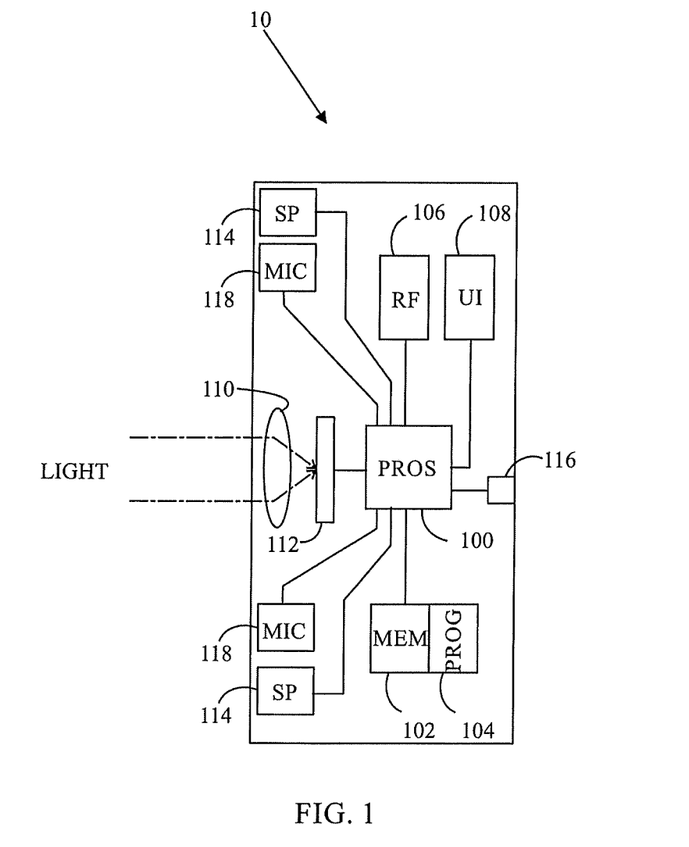
FIG. 1 illustrates an exemplary embodiment of an image and sound apparatus.

FIG. 1 illustrates an exemplary embodiment of an image and sound apparatus 10 for applying embodiments described in this document. Exemplary embodiments of an image and sound apparatus 10 are a subscriber unit, a user device, a user equipment (UE), a user terminal, an image and sound apparatus, a mobile station, a mobile device, a digital camera with or without a wireless data communication means, or the like.

The image and sound apparatus 10 may also be referred to a mobile or static device (e.g. a portable or non-portable computing device) that may include wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that the image and sound apparatus 10 may also be a nearly exclusive uplink only device, of which an example is a camera or video camera loading images or video clips to a network. The image and sound apparatus 10 may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The image and sound apparatus 10 may also utilise cloud. In some applications, a device may comprise a user portable device with radio parts (such as a watch, earphones or eyeglasses) and the computation is carried out in the cloud.

It should be understood that the image and sound apparatus 10 is depicted herein as an example illustrating some embodiments. It is apparent to a person skilled in the art that the image and sound apparatus 10 may also comprise other functions and/or structures and not all described functions and structures are required. Although the image and sound apparatus 10 has been depicted as one entity, different modules and memory may be implemented in one or more physical or logical entities.

The image and sound apparatus 10 includes a data processing and control circuitry 100 that is configured to process audio-visual data and control at least part of the operation of the image and sound apparatus 10.

The image and sound apparatus 10 may comprise a memory 102 for storing data. Furthermore, the memory may store software 104 executable by the control circuitry 100. The memory may be integrated in the control circuitry.

The image and sound apparatus 10 may comprise one or more interface circuitries 106, 108. The interface circuitries are operationally connected to the control circuitry 100. An interface circuitry 106 may be a set of transceivers configured to communicate with a RAN node, such as an (e/g) NodeB of a wireless communication network, or communicate utilising sidelink communication with an image and sound apparatus. The interface circuitry may be connected to an antenna arrangement (not shown). The image and sound apparatus 10 may also comprise a connection to a transmitter instead of a transceiver. The user interface 108 may comprise one of more of the following: a keyboard, a mouse, a touchscreen or the like.

In an embodiment, the image and sound apparatus 10 may comprise one or more image forming optical components 110 and an image sensor 112. The one or more optical components 110 may comprise one or more image forming lenses, for example, for forming a real image on an image sensor 112 which converts a real image thereon into an electric signal and feeds the electric signal to the data processing and control circuitry 100. The one or more image forming optical component 110 may comprise at least one lens with positive optical power i.e. it can be expressed using positive values measured in dioptres. Instead of that kind of a lens, a corresponding mirror may be used.

The user interface 108 may be connected with at least one of the following: one or more speakers 114, a connector 116 for headphones and/or at least one speaker for presenting an audio representation. The user interface 108 may also be connected with a spatial microphone 118 for receiving the audio signals from environment.

A binaural audio representation can be formed by having a pair of microphones spaced from each other with a similar distance as a distance between ears of a person, for example. A binaural spatial audio representation may also be captured or recorded according to other known methods.

With at least four cardioid microphones and/or an omni-directional microphones or the like it is possible to form either binaural or object-based form of a spatial audio representation although it is also possible to have a spatial audio representation with three microphones. The at least four microphones are pointed in different directions thereby covering a half sphere or a full sphere of $4\pi$ solid angle, for example. The binaural form can be converted into object-based audio representation and vice versa. Hence, any spatial audio representation is possible. There are a plurality of known possibilities, per se, to capture, record and/or generate spatial audio representations, and hence such solutions do not need to be discussed in detail in this document.

Because the audio representation is spatial, it can also be presented in the binaural or object-based form. For headphones, the audio representation may be recorded and/or replayed in the binaural form. For loudspeakers, the audio representation may recorded and/or replayed in the object-based form.

Audio zoom is an audio processing where sounds from a direction are amplified relative to other directions. This can be achieved using many different known methods such as beamforming or spatial filtering. Typically, three microphones make possible using zoom in the plane of defined by the microphones and four microphones that are not in a single plane make possible zooming in all directions.

A spatial zoomed sound can be created using known methods for example by beamforming to a desired direction and spatializing the beamformed signal using metadata analysed from the microphone signals. The metadata can include direction and direct-to-ambient ratio.

The user interface 108 may comprise a touch screen and/or a screen and a keyboard for presenting and controlling the presentation of the visual representation which may also be spatial.

In an embodiment, the user interface 108 does not necessarily comprise recording tools such as the one or more optical components 110 and the image sensor 112, and the spatial microphone 118.

In an embodiment, a software 104 may comprise a computer program comprising computer program code means adapted to cause the control circuitry 100 of the image and sound apparatus 10 to realise, utilising the components of the image and sound apparatus 10, at least some of the embodiments described in this document.

The image and sound apparatus 10 may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The computer program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The image and sound apparatus 10 is configured to cause audio processing to a spatial audio-visual representation of an image and sound apparatus. The spatial audio-visual representation may be live or the spatial audio-visual representation may be reproduced from recording. The spatial audio-visual representation may have earlier been recorded in memory of the image and sound apparatus 10, or the image and sound apparatus 10 may download the recording from a database, for example.

The audio processing may relate to features like moving parts of the audio environment or performing audio zooming in some directions to study the scene, for example. The audio processing may also refer to frequency filtering or variation and/or frequency wobbling such a pitch shifting the audio in an oscillating manner, for example. The following audio processing may lead to a relative magnification, amplification and/or distortion of the audio signals of the sector which has been processed beforehand which may generate annoying audio features without the modification.

The image and sound apparatus 10 is thus configured to modify the audio processing applied to an audio-visually manipulated spatial section of the spatial audio-visual representation in response to information on a prior audio-visual manipulation based on data processing in said manipulated spatial section.

Next the modification of the audio processing is explained using audio zooming as an example. However, it is clear that the same principles can be applied when using other types of audio processing, too.

The image and sound apparatus 10 causes audio zoom to be applied to a spatial audio-visual representation of the image and sound apparatus 10. The audio-visual representation refers to an electronic media that has both an audio component and a visual component. Here the term "zoom", in turn, refers to an operation where a certain sector of the spatial audio representation is preferred over another sector or the sectors excluding said certain sector. The audio zoom may mean that a sector of observation is narrowed from the original audio representation. The audio zoom leads to a relative magnification or amplification of the audio signals of the sector which the observation is narrowed to. The audio zoom is similar to an optical zoom or a digital zoom of visual representations i.e. still or video images.

The application of the audio zoom like any other audio processing may be performed under a user control. Here the user may be a person using the image and sound apparatus 10 through the user interface 108, like it is shown in FIGS. 2 to 6, or through a wired or wireless connection. The user may alternatively be a machine such as artificial intelligence (AI) included within the image and sound apparatus 10 or communicating with the image and sound apparatus 10 through the wired or wireless connection, for example.

The image and sound apparatus 10 then modifies the audio zoom applied to an audio-visually manipulated spatial section 204 of the spatial audio-visual representation in response to information on the prior audio-visual manipulation with data processing in said audio-visually manipulated spatial section 204.

Examine now an exemplary situation of FIGS. 2 to 6 how the modification of the audio zoom to the audio-visually manipulated spatial section can be utilized.

Figure 2:
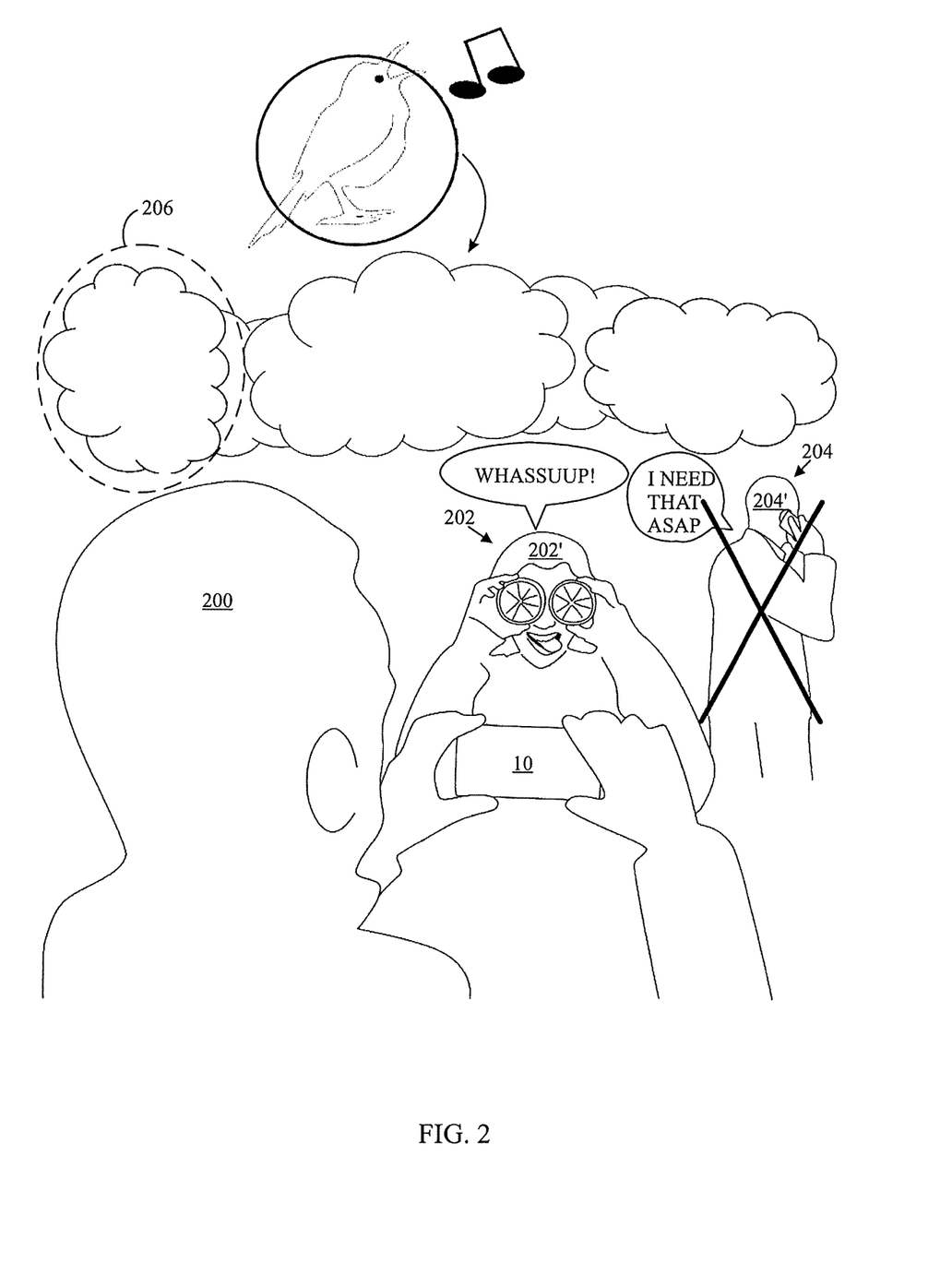
FIG. 2 illustrates an example of a live video capture.

In an example of FIG. 2, the user 200 is capturing a live video with spatial audio using the image and sound apparatus 10. The user may be in a park, and a user's friend, who is a desired audio-visual object 202' of the spatial representation in a spatial section 202, is making funny faces using a halved orange to cover his eyes, for example. The user thinks this is some quality content for his popular YouTube channel! However, a business man in the background is talking loudly on his mobile phone. He is thus an unwanted audio-visual object 204' to be manipulated in the video in order to reduce the disturbance to the desired audio-visual object 202' because such a distraction is highly undesirable (and potentially also a privacy concern). The business man in this spatial representation can be considered an unwanted audio-visual object 204' of the spatial representation from the user point of view. There may also be some birds singing behind bushes which is not necessarily a nuisance.

The user indicates through the user interface 108, for example, that the disturbing and/or unwanted audio-visual object 204', where the feature that the quality deteriorating audio-visual object is indeed disturbing and/or unnecessary is decided by the user 200, is unwanted and should be modified. For example, the user 200 may select the unwanted audio-visual object 204' thereby causing the spatial section of the unwanted audio-visual object 204' of the spatial audio-visual representation to be ready for the manipulation. The selection may be performed by utilizing the user interface 108 such that the unwanted audio-visual object 204' is painted over with a finger on the touch-screen, for example. Then image and audio processing of the image and sound apparatus 10 may manipulate the unwanted audio-visual object 204' such that the unwanted audio-visual object 204' is fully or partly removed, or replaced by something else. In an embodiment like this example makes it clear, the image and sound apparatus 10 may receive the information on the prior audio-visual manipulation in said manipulated spatial section 204 from a user interface 108.

The manipulation of a spatial section of the unwanted audio-visual object 204' may be performed by a computer program such as CAF (Content Aware Fill) function, which may fill a section of the unwanted audio-visual object 204' in the video with suitable content from the captured frame(s) or remove the spatial section. Hence, the spatial section with the unwanted audio-visual object 204' becomes an audio-visually manipulated spatial section 204. Here the audio-visually manipulated spatial section 204 may refer to a sector of a spherical coordinate system that includes the unwanted audio-visual object 204' or the manipulated spatial section 204 may mean the unwanted audio-visual object 204' itself. Sometimes it may be practical manipulate at least a slightly larger area than merely the unwanted audio-visual object 204'. For example, edges of the unwanted audio-visual object 204' may require some adjusting manipulation. Hence, the audio-visual representation may be or may be comprised in media content of a video, where an audio-visually manipulated object 204' is or is comprised in the manipulated spatial section 204.

The CAF command of the image and sound apparatus 10 can remove unwanted and/or distracting objects from audio-visual representations like photos and videos that also have audio contents. Typically an unwanted object is selected by circling the area, and the audio-visual process will manipulate the object and/or the selected spatial section including the unwanted object such that the unwanted object smoothed away. The selection of the unwanted object serves as information on the prior audio-visual manipulation with data processing in said manipulated spatial section 204 because it defines the location of manipulation unambiguously.

Figure 3:
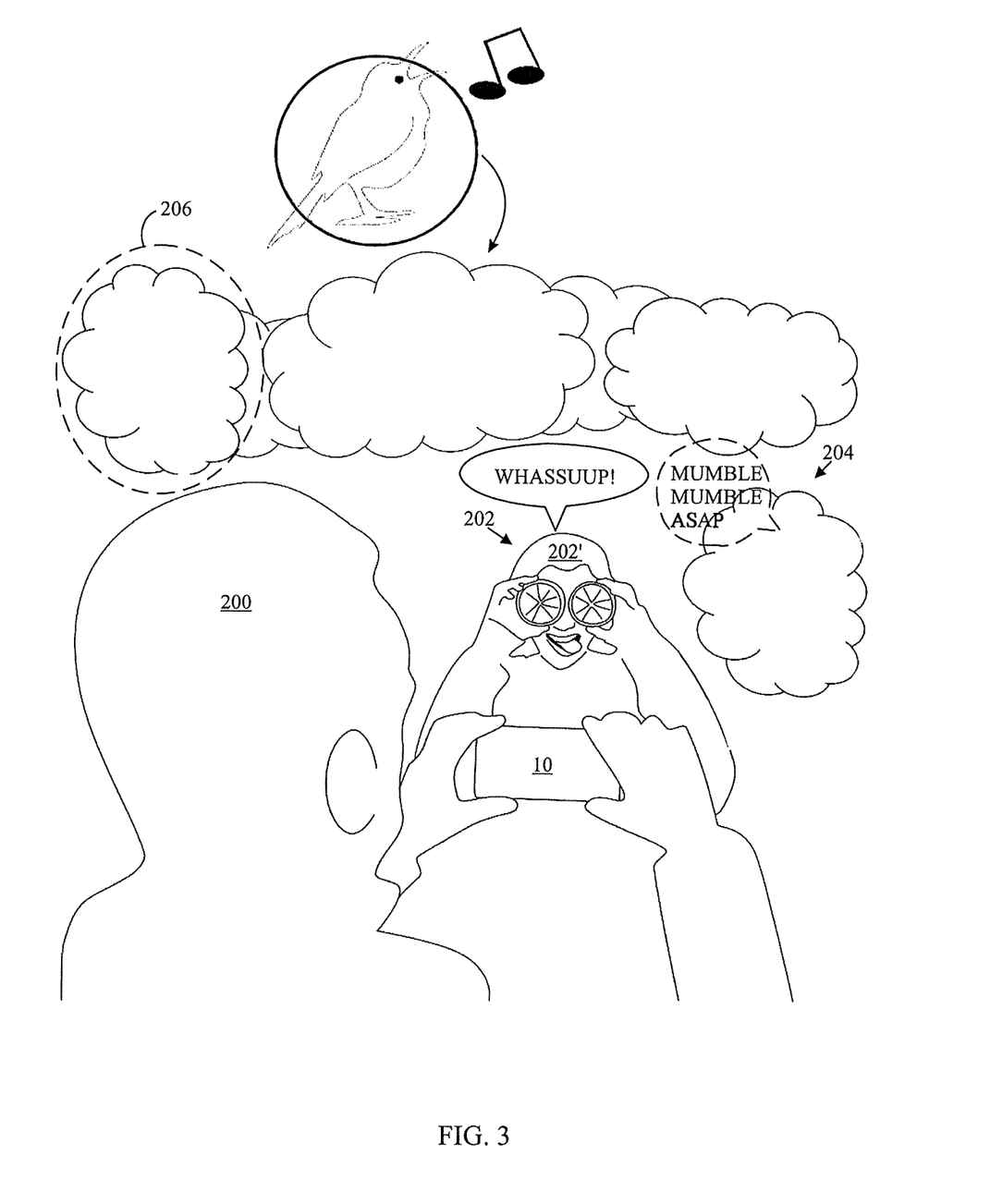
FIG. 3 illustrates an example of a CAF operation applied to the live video capture.

In an embodiment an example of which is shown in FIG. 3, the user 200 may wish to remove the unwanted audio-visual object 204', which is in this example the distracting businessman in the background. Then the CAF function may analyze the surrounding area, and fill in the manipulated spatial section 204 with an "empty" region, for example. In such a case, the CAF may find a replacement section 206 that is a good match from the left-hand side of the frame. The replacement section 206 in this example includes a bush.

The means for causing the audio zoom to the spatial audio-visual representation may also manipulate the unwanted audio of the loud businessman in the same direction or in the corresponding sector as the visual manipulation such that no audio from the unwanted audio-visual object 204' would appear. The result may be that the user hears his friend and also the bird singing. However, some audio remnants of the loud businessman are still there. The unwanted audio remnants, which is marked with MUMBLE MUMBLE ASAP in FIG. 3, may typically be hardly audible due to other audio sounds and voices and a low level of the residual if the user does not make further processing such as an audio zoom on the audio-visual representation. However, there is a problem if the user now makes further processing such as audio zooming or the like on the video, because the further processing may amplify the remnants and they become hearable which may be disturbing and/or discomfortable.

Figure 4:
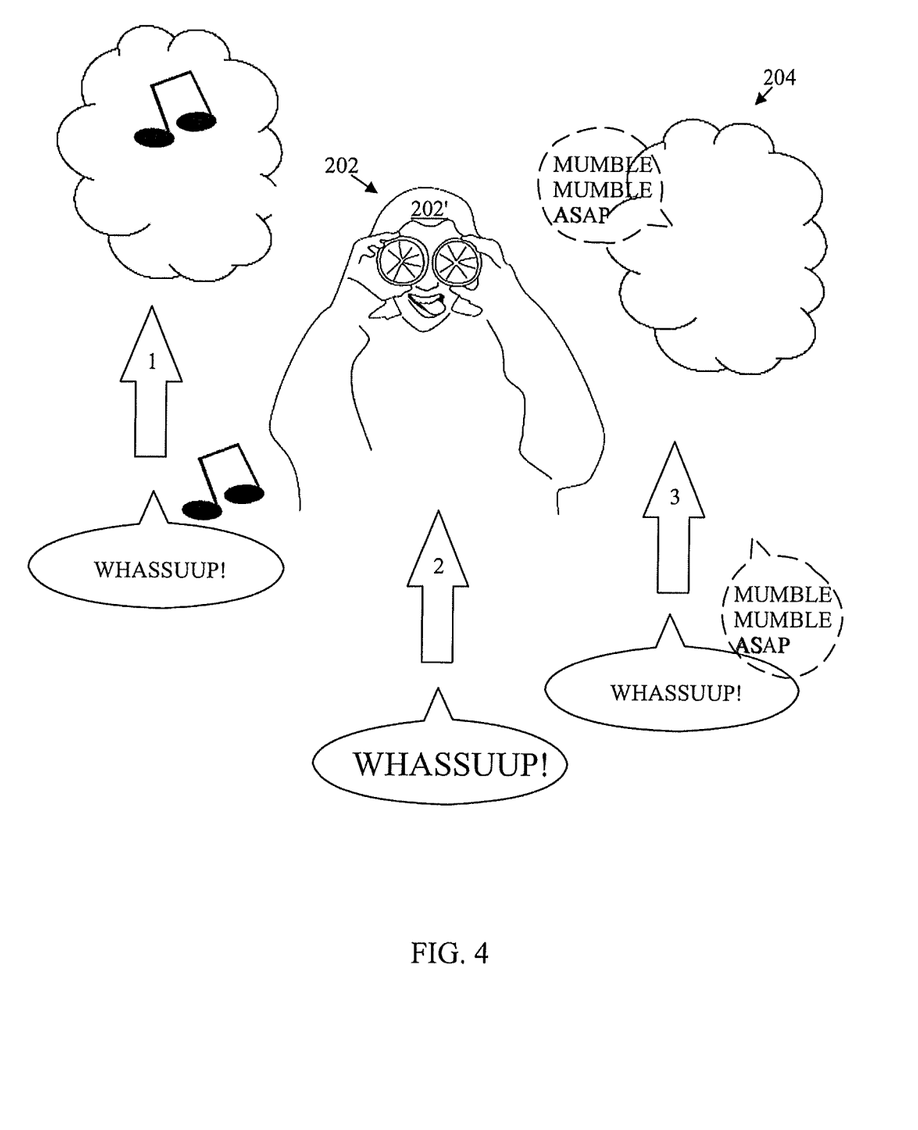
FIG. 4 illustrates an example of audio zoom applied to the video that has been audio-visually manipulated with the CAF operation.

FIG. 4 illustrates an exemplary embodiment where the audio zoom of the prior art has been directed to three different sections in the audio-visual representation which are shown with marked arrows. The first section, which is marked with an arrow marked with number 1, is to the left of the desired audio-visual object 202'. There audio signal comprises sound of the bird singing (marked with note) and the desired audio-visual object audio: WHASSUUP! When the audio zoom is directed towards a section which is marked with an arrow having number 2 and where the desired audio-visual object 202' is, a louder WHASSUUP! can be heard. Finally, when the audio zoom is directed to the audio-visually manipulated spatial section 204 marked with an arrow having number 3, both the WHASSUUP! and remnants (MUMPLE MUMBLE ASAP) of the voice of the loud businessman can be heard thus causing a negative effect to the user experience of the audio-visual representation. The MUMPLE MUMBLE ASAP may actually be more or less distorted because of the CAF operation.

Figure 5:
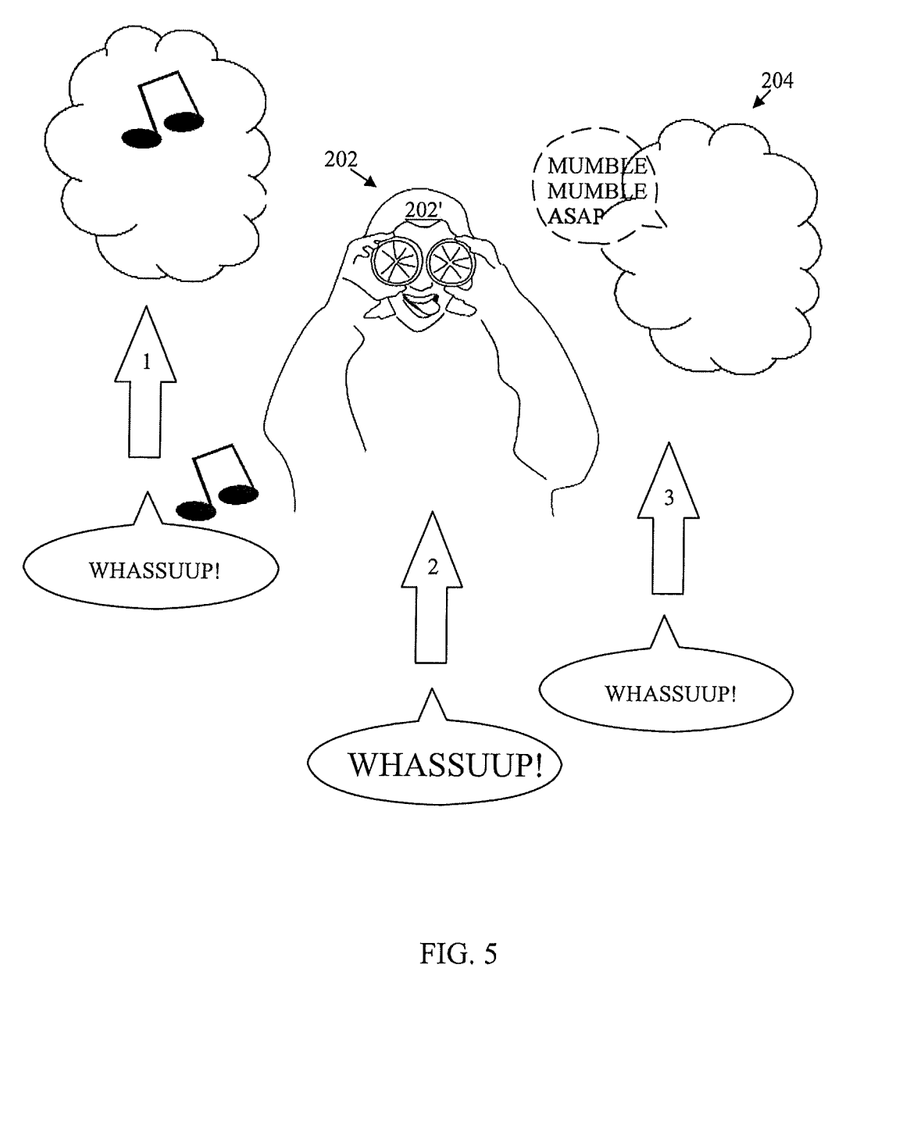
FIG. 5 illustrates an example of application of modified audio zoom to the video that includes a prior audio manipulation.

FIG. 5 illustrates an exemplary embodiment where the modified audio zoom is applied to the audio-visual representation utilizing at least one of the several application manners.

In an embodiment, the audio processing may be applied to the manipulated spatial section 204 of the spatial audio-visual representation in a first application manner in response to the information on the prior audio-visual manipulation in said manipulated spatial section 204. The audio processing may then be applied in a second application manner to a spatial section being unassociated with the audio-visual manipulation, the second application manner being different from the first application manner. The first and second application manner may differ from each other in amplification, for example. When the audio processing is applied to the audio-visually manipulated spatial section 204, the amplification of audio signals may be lower than that of an audio-visually non-manipulated audio-visual section. In an embodiment, a range of amplification is smaller for the audio-visually manipulated spatial section 204 than that of an audio-visually non-manipulated audio-visual section.

In an embodiment, the audio processing may be applied to the manipulated spatial section 204 of the spatial audio-visual representation in the first application manner and to surrounding of said manipulated spatial section 204 in the second application manner.

These application manners mean that the manipulated spatial section 204 is treated differently from the non-manipulated sections of the spatial audio-visual representation in the audio processing, which may allow reduction of hearable remnants caused by the prior audio-visual manipulation.

In an embodiment, the application of the audio zoom is restricted to the manipulated spatial section 204. According to this application manner, the audio zoom may be prevented from being applied in the manipulated spatial section 204 in response to information on the prior audio-visual manipulation such as a CAF modification in the manipulated spatial section 204. The audio zoom operation is, however, allowed to be applied to such one or more spatial sections of the spatial audio-visual representation that are unassociated with the information on the prior audio-visual manipulation in said one or more spatial sections.

In an embodiment, the audio zoom may be applied, instead of the manipulated spatial section 204, to a spatial section without the audio-visual manipulation in response to the information on the prior audio-visual manipulation in the manipulated spatial section 204. That is, the audio zoom may be applied in a CAF replacement direction i.e. the audio zoom is targeted to the replacement section 206 that replaces the manipulated spatial section 204 and that is also used instead of manipulated spatial section 204 in the visual representation. Hence, the spatial section without the prior audio-visual manipulation is a spatial section with an audio source used to replace an audio source of the audio-visually manipulated section 204.

In a third application manner, the audio zoom may be applied to a section with the desired audio-visual object 202' but without the unwanted audio-visual object 204' when applying the audio zoom to the manipulated spatial section 204. That is, the audio zoom is applied to a direction of the audio in the CAF source i.e. the audio zoom is targeted toward the desired audio-visual object 202' at the expense of the unwanted audio-visual object 204' and play this back from the audio zoom direction.

Figure 6:
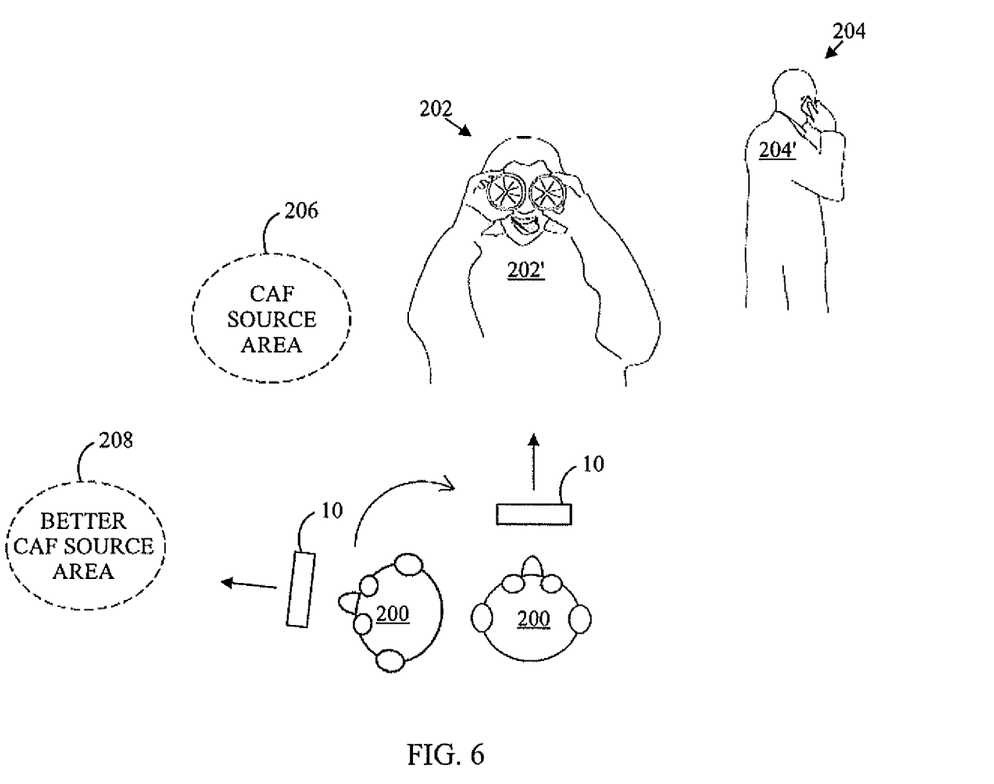
FIG. 6 illustrates an example where the audio zoom may be applied to a spatial section that has at least one similar audio-visual object to that in a replacement spatial section of the CAF operation.

In a fourth application manner, an example of which is shown in FIG. 6 and which may be considered a sub-feature of the second application manner, the audio zoom may be applied to a spatial section 208 that has at least one similar audio-visual object to that in the replacement section 206.

In an embodiment, the user 200 may utilize a mobile device for video capture or a 360-degree video capture device can be used, for example. Thus, extent of the visual spatial representation of the video may be different from audio spatial representation, and for example CAF source area may in some cases be outside the user's current viewport. Audio is often spatial, and hence at least the directions of the audio reception relative to a field-of-view of a video capture need to be understood. That is, the coordinate systems of the audio and video should have known relation or they should use the same coordinate system with a common origin.

In the example of FIG. 6, the user 200 may be panning, for example, such that the user 200 first points the image and sound apparatus 10 in a first direction and then turns towards the desired audio-visual object 202' of interest in a second direction. Thus, for purpose of removing an unwanted object, the system may find an even more suitable CAF source section i.e. a more suitable replacement spatial section 208 than what is in the current capture frame based on the previous frames that were shot in a different direction. Analogously, this could be found in future frames if the action is post-processed. This is a further example why it can be useful to provide the user with information on the direction from which the CAF was sourced. Note that in some captures, e.g. like certain mobile captures, this area may be outside the current view.

In an embodiment, the audio processing and image processing are applied conjointly to the audio-visual representation. This means that when a certain sector of the visual representation is zoomed (or otherwise audio processed), i.e. in zooming the field-of-view is narrowed/widened, the audio field-of-hearing, which is a sector from which the audio signals are received, is similarly and synchronously narrowed/widened (or otherwise processed).

These three alternative application manners have different merits. When the image and sound apparatus does not apply the audio zoom or other audio processing in the direction of the removed content, the user hears no change in the audio. This relieves or eliminates the problem of remnants.

When the image and sound apparatus applies the audio zoom or other audio processing in the direction of the CAF source content the user hears the birds in the bushes better in the presented example, since this second direction corresponds with the direction of the CAF source content. The problem of remnants is again solved, and the user hears a clear response to the audio zoom request. The response also makes sense, since it provides user more information about the content. For example, the bushes relate to the bird songs. In this manner, duplication of audio sources can also be avoided.

When the image and sound apparatus applies the audio zoom or other audio processing for the content in the direction of the CAF source and plays it back from the direction of the audio zoom, the user will in this case hear the singing of the birds better, and these sounds will appear to come from the direction of the audio zoom. Thus, the problem of remnant is also in this case avoided, and the response is good and natural.

Figure 7:
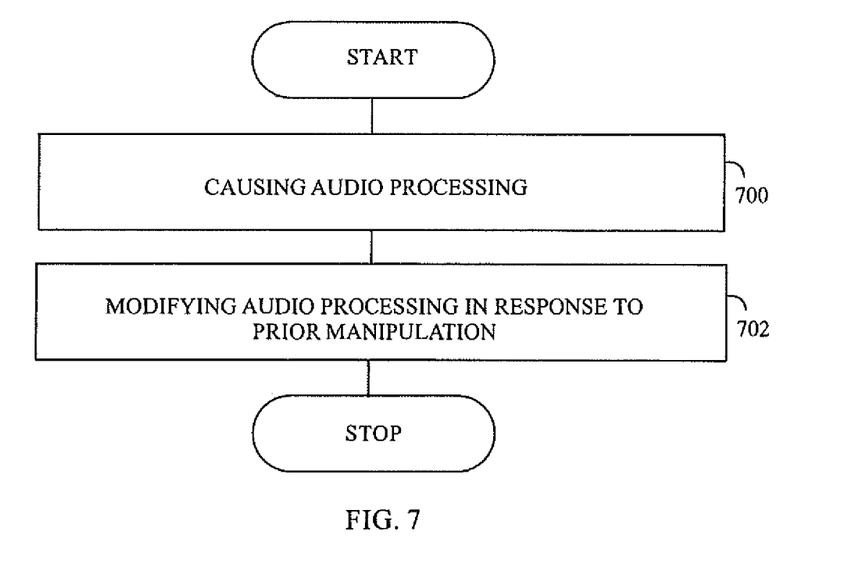
FIG. 7 illustrates of an example of a flow chart of a method of processing spatial audio-visual representation.

FIG. 7 is a flow chart of the measurement method. In step 700, audio processing is caused to a spatial audio-visual representation. In step 702, the audio processing applied to a manipulated spatial section of the spatial audio-visual representation is modified in response to information on a prior audio-visual manipulation with data processing in said manipulated spatial section.

The steps and related functions described in this document and attached Figs are in no absolute chronological order, and some of the steps may be performed simultaneously or in an order differing from the given one. Other functions can also be executed between the steps or within the steps. Some of the steps can also be left out or replaced with a corresponding step.

An embodiment provides a computer program embodied on a distribution medium, comprising program instructions which, when loaded into an electronic apparatus, are configured to control the apparatus to execute at least the following: causing audio processing to a spatial audio-visual representation of an image and sound apparatus, and modifying the audio processing applied to an audio-visually manipulated spatial section of the spatial audio-visual representation in response to information on a prior audio-visual manipulation with data processing in said manipulated spatial section.

An embodiment provides a non-transitory computer readable medium comprising program instructions for causing an apparatus to perform at least the following: causing audio processing to a spatial audio-visual representation of an image and sound apparatus, and modifying the audio processing applied to an audio-visually manipulated spatial section of the spatial audio-visual representation in response to information on a prior audio-visual manipulation with data processing in said manipulated spatial section.

An embodiment provides a computer readable medium comprising program instructions for causing an apparatus to perform at least the following: causing audio processing to a spatial audio-visual representation of an image and sound apparatus, and modifying the audio processing applied to an audio-visually manipulated spatial section of the spatial audio-visual representation in response to information on a prior audio-visual manipulation with data processing in said manipulated spatial section.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the concept presented in this document can be implemented in various ways. The invention and its embodiments are not limited to the example embodiments described above but may vary within the scope of the claims.

The invention claimed is:

1. An apparatus comprising:
   at least one processor; and
   at least one memory storing instructions that, when executed with the at least one processor, cause the apparatus at least to:
      cause audio processing of a spatial audio-visual representation, the spatial audio-visual representation being live or reproduced from recording, wherein the audio processing is configured to be applied to, at least, a first spatial section of the spatial audio-visual representation and an audio-visually manipulated spatial section of the spatial audio-visual representation; and
      modify application of the audio processing to the audio-visually manipulated spatial section of the spatial audio-visual representation based, at least partially, on information on a prior audio-visual manipulation, with data processing, in the audio-visually manipulated spatial section, wherein the first spatial section is unassociated with the information on the prior audio-visual manipulation, wherein the modified application of the audio processing to the audio-visually manipulated spatial section is at least partially different from application of the audio processing to the first spatial section, wherein modifying the application of the audio processing to the audio-visually manipulated spatial section comprises the instructions, when executed with the at least one processor, cause the apparatus to:
    cause the audio processing to be applied to a second spatial section of the spatial audio visual representation that replaces the audio-visually manipulated spatial section, wherein a direction of the second spatial section within the spatial audio-visual representation is at least partially different from a direction of the audio-visually manipulated spatial section within the spatial audio-visual representation; and
    modify the audio processed second spatial section based, at least partially, on the direction of the audio-visually manipulated spatial section for replacing the audio-visually manipulated spatial section.

2. An apparatus according to claim 1, wherein the audio-visual manipulation is performed prior to the audio processing.

3. An apparatus according to claim 1, wherein modifying the application of the audio processing to the audio-visually manipulated spatial section comprises the instructions, when executed with the at least one processor, cause the apparatus to:
    cause the application of the audio processing to the audio-visually manipulated spatial section of the spatial audio-visual representation to be modified in a first application manner; and
    cause application of the audio processing to a spatial area surrounding said audio-visually manipulated spatial section to be modified in a second application manner.

4. An apparatus according to claim 1, wherein modifying the application of the audio processing to the audio-visually manipulated spatial section comprises the instructions, when executed with the at least one processor, cause the apparatus to:
    prevent the audio processing from being applied to the audio-visually manipulated spatial section of the spatial audio-visual representation based, at least partially, on the information on the prior audio-visual manipulation in said audio-visually manipulated spatial section; and
    allow the audio processing to be applied to one or more spatial sections of the spatial audio-visual representation, the one or more spatial sections being unassociated with the information on the prior audio-visual manipulation.

5. An apparatus according to claim 1, wherein the second spatial section that replaces the audio-visually manipulated spatial section comprises a spatial section without the prior audio-visual manipulation.

6. An apparatus according to claim 5, wherein the instructions, when executed with the at least one processor, cause the apparatus to:
    cause the audio processing and image processing to be applied con jointly to the spatial audio-visual representation.

7. An apparatus according to claim 1, wherein the instructions, when executed with the at least one processor, cause the apparatus to:
    receive the information on the prior audio-visual manipulation in the audio-visually manipulated spatial section from a user interface of the apparatus.

8. An apparatus according to claim 1, wherein the audio processing comprises audio zooming.

9. An apparatus according to claim 1, wherein the spatial audio-visual representation is, or is comprised in, media content of a video, where an audio-visually manipulated object is, or is comprised in, the audio-visually manipulated spatial section.

10. An apparatus according to claim 1, wherein the instructions, when executed with the at least one processor, cause the apparatus to:
    cause manipulation of a further spatial section of the spatial audio-visual representation to generate the audio-visually manipulated spatial section of the spatial audio-visual representation, wherein the prior audio-visual manipulation comprises at least one of:
        removing at least part of audio of the further spatial section, or
        replacing at least part of the audio of the further spatial section.

11. A method comprising:
causing audio processing of a spatial audio-visual representation, the spatial audio-visual representation being live or reproduced from recording, wherein the audio processing is configured to be applied to, at least, a first spatial section of the spatial audio-visual representation and an audio-visually manipulated spatial section of the spatial audio-visual representation; and
modifying application of the audio processing to the audio-visually manipulated spatial section of the spatial audio-visual representation based, at least partially, on information on a prior audio-visual manipulation, with data processing, in the audio-visually manipulated spatial section, wherein the first spatial section is unassociated with the information on the prior audio-visual manipulation, wherein the modified application of the audio processing to the audio-visually manipulated spatial section is at least partially different from application of the audio processing to the first spatial section, wherein modifying the application of the audio processing to the audio-visually manipulated spatial section comprises:
    causing the audio processing to be applied to a second spatial section of the spatial audio visual representation that replaces the audio-visually manipulated spatial section, wherein a direction of the second spatial section within the spatial audio-visual representation is at least partially different from a direction of the audio-visually manipulated spatial section within the spatial audio-visual representation; and
    modifying the audio processed second spatial section based, at least partially, on the direction of the audio-visually spatial section for manipulated replacing the audio-visually manipulated spatial section.

12. A method according to claim 11, wherein the second spatial section that replaces the audio-visually manipulated spatial section comprises a spatial section without the prior audio-visual manipulation.

13. A method according to claim 11, wherein the modifying of the application of the audio processing to the audio-visually manipulated spatial section further comprises:
causing the application of the audio processing to the audio-visually manipulated spatial section of the spatial audio-visual representation to be modified in a first application manner; and
causing the application of the audio processing to a spatial area surrounding said audio-visually manipulated spatial section to be modified in a second application manner.

14. A method according to claim 11, further comprising:
causing manipulation of a further spatial section of the spatial audio-visual representation to generate the audio-visually manipulated spatial section of the spatial audio-visual representation.

15. A method according to claim 11, wherein the audio-visual manipulation is performed prior to the audio processing.

16. A non-transitory computer-readable medium comprising program instructions stored thereon for performing at least the following:
causing audio processing of a spatial audio-visual representation, the spatial audio-visual representation being live or reproduced from recording, wherein the audio processing is configured to be applied to, at least, a first spatial section of the spatial audio-visual representation and an audio-visually manipulated spatial section of the spatial audio-visual representation; and
modifying application of the audio processing to the audio-visually manipulated spatial section of the spatial audio-visual representation based, at least partially, on information on a prior audio-visual manipulation, with data processing, in the audio-visually manipulated spatial section, wherein the first spatial section is unassociated with the information on the prior audio-visual manipulation, wherein the modified application of the audio processing to the audio-visually manipulated spatial section is at least partially different from application of the audio processing to the first spatial section, wherein modifying the application of the audio processing to the audio-visually manipulated spatial section comprises:
causing the audio processing to be applied to a second spatial section of the spatial audio visual representation that replaces the audio-visually manipulated spatial section, wherein a direction of the second spatial section within the spatial audio-visual representation is at least partially different from a direction of the audio-visually manipulated spatial section within the spatial audio-visual representation; and
modifying the audio processed second spatial section based, at least partially, on the direction of the audio-visually manipulated spatial section for replacing the audio-visually manipulated spatial section.

17. The non-transitory computer-readable medium as claimed in claim 16, wherein the second spatial section that replaces the audio-visually manipulated spatial section comprises a spatial section without the prior audio-visual manipulation.

18. The non-transitory computer-readable medium as claimed in claim 16, wherein the program instructions stored thereon for modifying the application of the audio processing to the audio-visually manipulated spatial section are further for performing at least one of:
causing the application of the audio processing to the audio-visually manipulated spatial section of the spatial audio-visual representation to be modified in a first application manner; and
causing the application of the audio processing to a spatial area surrounding said audio-visually manipulated spatial section to be modified in a second application manner.

19. The computer-readable medium as claimed in claim 16, wherein the program instructions stored thereon are further for performing:
causing manipulation of a further spatial section of the spatial audio-visual representation to generate the audio-visually manipulated spatial section of the spatial audio-visual representation.

20. The computer-readable medium as claimed in claim 16, wherein the audio-visual manipulation is performed prior to the audio processing.

* * * * *